(12) United States Patent
Hukill et al.

(10) Patent No.: US 6,374,960 B1
(45) Date of Patent: Apr. 23, 2002

(54) BRAKE ASSEMBLY

(75) Inventors: Brian R. Hukill, Cuyahoga Falls; James M. Latsko, Parma; Kenneth E. Oravec, Independence; Steven D. Schneider, Cleveland, all of OH (US); George M. Dominiak, Greenfield; Kerry M. Jacques, Cudahy, both of WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/415,639

(22) Filed: Oct. 12, 1999

(51) Int. Cl.[7] .......................... F16D 65/14; F16D 55/08
(52) U.S. Cl. .................... 188/73.43; 188/72.9; 188/171
(58) Field of Search .............................. 188/18 A, 71.1, 188/72.9, 73.41, 73.42, 73.43, 171, 261, 250 G, 250 H, 253, 71.5, 73.1, 72.6

(56) References Cited

U.S. PATENT DOCUMENTS

| | | | |
|---|---|---|---|
| 2,925,153 A | | 2/1960 | Hodgson |
| 3,037,860 A | | 6/1962 | Masterson et al. |
| 3,520,386 A | | 7/1970 | Rogier |
| 3,844,385 A | * | 10/1974 | Szekely .................... 188/70 B |
| 4,066,152 A | * | 1/1978 | Pascal ........................ 188/171 |
| 4,067,420 A | | 1/1978 | Fabris |
| 4,540,067 A | * | 9/1985 | Meymier .................... 188/71.5 |
| 4,592,451 A | | 6/1986 | Persson |
| 4,705,145 A | * | 11/1987 | Goulart ...................... 188/18 A |
| 4,901,823 A | * | 2/1990 | Chang ........................ 188/73.1 |
| 5,101,939 A | | 4/1992 | Sheridan |
| 5,582,277 A | | 12/1996 | Heidenreich et al. |
| 5,873,434 A | * | 2/1999 | Sugita ......................... 187/288 |
| 5,944,150 A | * | 8/1999 | Hikari ......................... 188/161 |
| 5,957,248 A | * | 9/1999 | Heidenreich ................ 188/171 |

FOREIGN PATENT DOCUMENTS

| | | | |
|---|---|---|---|
| DE | 21 43 152 | | 3/1973 |
| DE | 26 46 736 | | 4/1977 |
| EP | 0143941 | * | 6/1985 |

\* cited by examiner

*Primary Examiner*—J. J. Swann
*Assistant Examiner*—David Divine
(74) *Attorney, Agent, or Firm*—Tarolli, Sundheim, Covell, Tummino & Szabo L.L.P.

(57) ABSTRACT

A brake assembly includes a rotatable disc which is movable along its axis of rotation. Brake pads on caliper arms are engageable with opposite sides of the disc. An actuator assembly is operable to move the caliper arms to press the brake pads against opposite sides of the disc. To accommodate movement of the disc along its axis of rotation, the actuator assembly is movable along the axis of rotation of the disc under the influence of force transmitted through the caliper arms to the actuator assembly. The caliper arms have arcuate end surfaces which engage arcuate surfaces on the brake pads.

44 Claims, 5 Drawing Sheets

BRAKE ASSEMBLY

BACKGROUND OF THE INVENTION

The present invention relates to a new and improved brake assembly, and more specifically, to a disc brake assembly and brake pads used with the disc brake assembly.

A rotatable disc in a disc brake assembly may be movable in an axial direction by an apparatus to which the disc is connected. The brake assembly must be constructed in such a manner as to accommodate the axial movement of the rotatable disc. In U.S. Pat. No. 5,582,277, it is suggested that a caliper disc brake assembly be constructed to accommodate axial movement of a disc.

SUMMARY OF THE INVENTION

The present invention provides a new and improved brake assembly having a rotatable disc which is movable along its axis of rotation. Improved brake pads are pressed against opposite sides of the disc by caliper arms. An actuator assembly is connected with the caliper arms and is operable to cause the caliper arms to press the brake pads against opposite sides of the disc.

The actuator assembly is supported for movement along the axis of rotation of the disc to accommodate movement of the disc along its axis of rotation. The actuator assembly is movable along the axis of rotation of the disc under the influence of force transmitted from the disc through the caliper arms to the actuator assembly.

BRIEF DESCRIPTION OF THE DRAWINGS

The foregoing and other features of the invention will become more apparent upon a consideration of the following description taken in connection with the accompanying drawings wherein.

DESCRIPTION OF SPECIFIC PREFERRED EMBODIMENTS OF THE INVENTION

General Description

Figure 1:
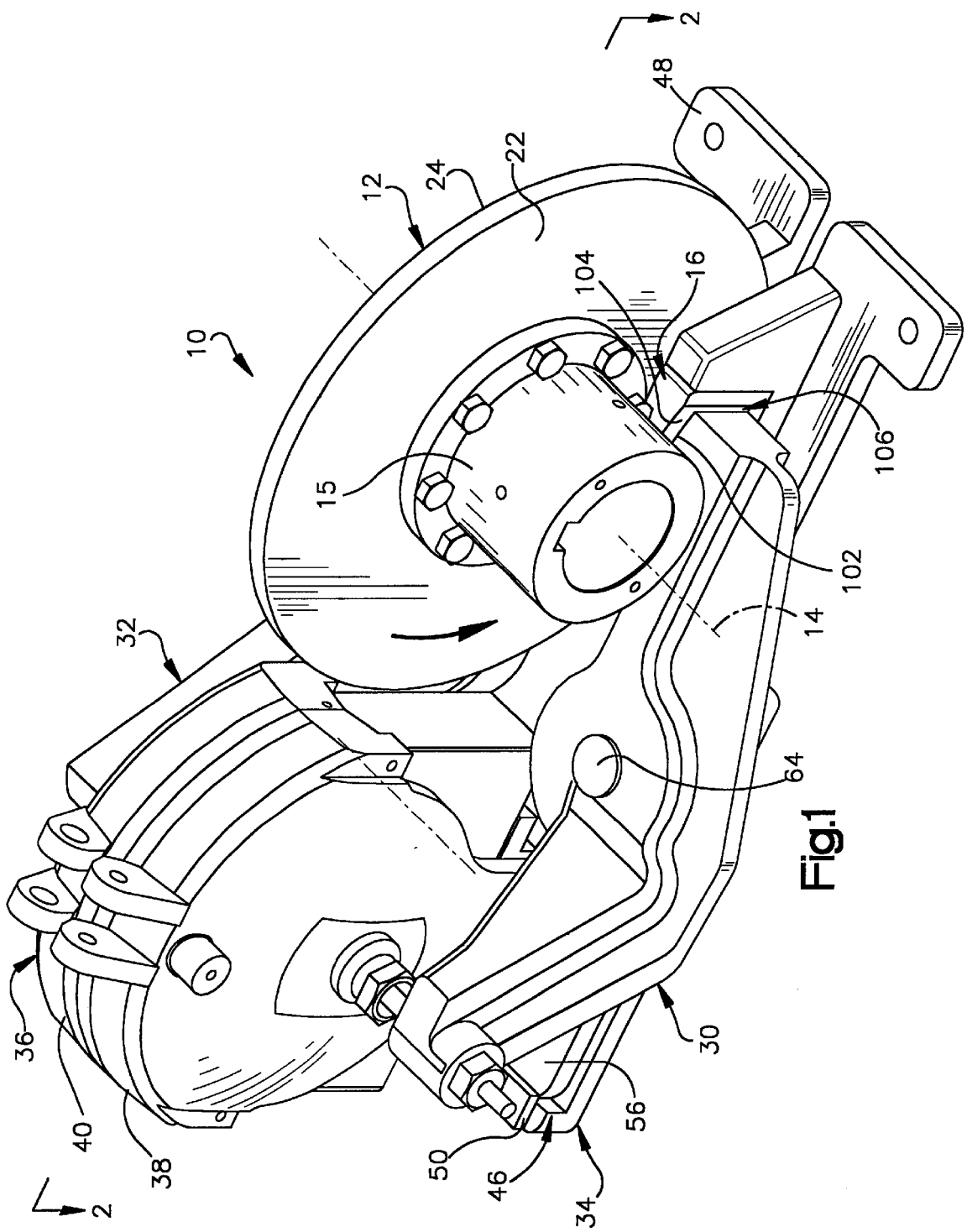
FIG. 1 is a pictorial illustration of a brake assembly constructed and operated in accordance with the present invention and having a disc which is movable along its axis of rotation.

A brake assembly 10 constructed and operated in accordance with the present invention is illustrated in FIG. 1. The brake assembly 10 includes a rotatable circular disc 12 which is movable along its axis 14 of rotation. The disc 12 is connected with a drive mechanism (not shown), such as a DC motor, by a cylindrical hub 15. In order to hold the disc 12 against rotation about the axis 14, a pair of improved brake pads 16 and 18 (FIGS. 1 and 2) are engageable with axially opposite flat annular side surfaces 22 and 24 of the disc 12.

The brake pads 16 and 18 (FIGS. 1 and 2) are pressed against the axially opposite side surfaces 22 and 24 of the disc 12 by a pair of caliper arms 30 and 32. The caliper arms 30 and 32 are pivotal relative to a base 34 of the brake assembly 10 by an actuator assembly 36.

The actuator assembly 36 has a known construction which includes a pair of armatures 38 and 40. The armatures 38 and 40 are pivotally connected with the base 34 and are urged apart by a strong coil spring (not shown) to cause the caliper arms 30 and 32 to press the brake pads 16 and 18 against the opposite sides 22 and 24 of the disc 12. The actuator assembly 36 contains an electromagnet (not shown) which is energizeable to move the armatures 38 and 40 toward each other to pivot the caliper arms 30 and 32 to disengage the brake pads 16 and 18 from the disc 12. The actuator assembly 36 has the same general construction disclosed in U.S. Pat. No. 2,925,153 and in the aforementioned U.S. Pat. No. 5,582,277.

Figure 2:
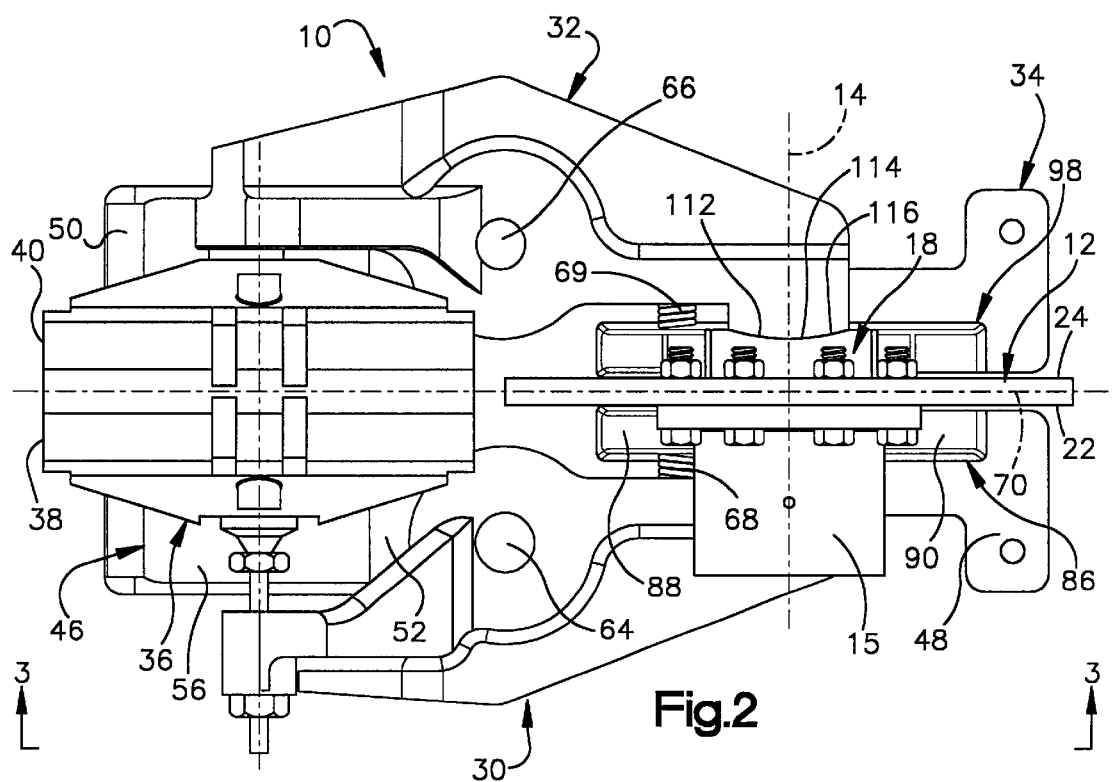
FIG. 2 is a top plan view, taken generally along the line 2—2 of FIG. 1, illustrating the relationship between the disc, brake pads, a pair of caliper arms, and an actuator assembly in the brake assembly of FIG. 1.
Figure 3:
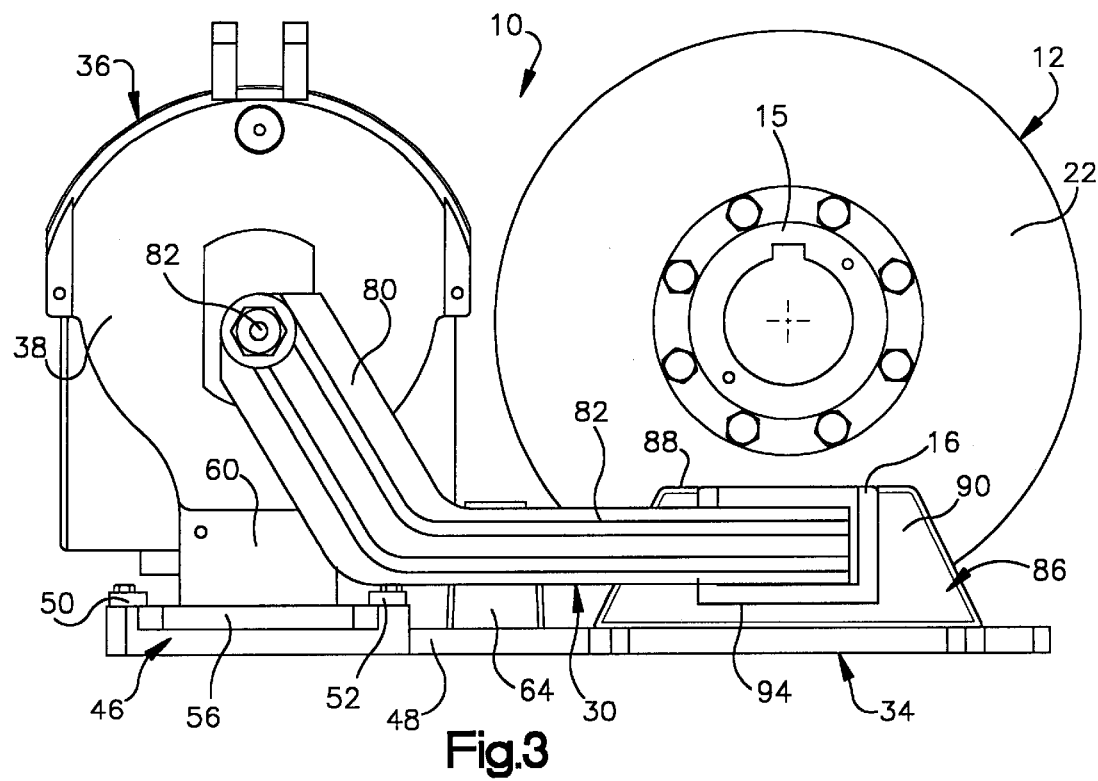
FIG. 3 is a side elevational view, taken generally along the line 3—3 of FIG. 2, illustrating the manner in which the actuator assembly and one of the caliper arms are connected with a support assembly.

In accordance with one of the features of the present invention, the actuator assembly 36 is movable relative to the base 34 to accommodate axial movement of the disc 12. To enable the actuator assembly 36 to move relative to the base 34 along the axis 14 of rotation of the disc 12, the actuator assembly is connected with the base by a support assembly 46 (FIGS. 1, 2 and 3). The base 34 includes a base plate 48.

The support assembly 46 includes a pair of straight guide tracks or members 50 and 52 (FIG. 3) which are fixedly connected with the base plate 48. In addition, the support assembly 46 includes a rectangular actuator assembly support plate 56 which is movable along the guide tracks 50 and 52. The guide tracks 50 and 52 extend parallel to the axis 14 about which the disc 12 rotates (FIG. 2). A greater or lesser number of guide tracks could be provided if desired.

The actuator assembly 36 is mounted on the support plate 56 for movement therewith relative to the base 34 and disc 12. The armatures 38 and 40 of the actuator assembly 36 are connected with the support plate 56 by a pair of spring plates 60 (only one of which is illustrated in FIG. 3). The spring plates 60 allow the armatures 38 and 40 to pivot relative to each other in the manner disclosed in U.S. Pat. Nos. 2,925,153 and 5,582,277.

The caliper arms 30 and 32 (FIG. 2) are pivotally connected with the base plate 48 by a pair of parallel pivot posts 64 and 66 (FIGS. 2 and 3). The pivot posts 64 and 66 are fixedly connected to and extend perpendicular to the base plate 48. The caliper arms 30 and 32 are pivotal about the central axes of the pivot posts 64 and 66 relative to the base plate 48. The central axes of the pivot posts 64 and 66 extend perpendicular to the axis 14 about which the disc 12 rotates.

When the brake assembly 10 is in a disengaged condition so that the disc 12 is freely rotatable about the axis 14, an electromagnet in the actuator assembly 36 is energized to pull the armatures 38 and 40 toward each other. This results in the caliper arm 30 being pivoted in a clockwise direction (as viewed in FIG. 2) about the pivot post 64 by a biasing spring 68. The caliper arm 32 is pivoted in a counterclockwise direction (as viewed in FIG. 2) about the pivot post 66 by a biasing spring 69. This pivotal movement of the caliper arms 30 and 32 in opposite directions about the pivot posts 64 and 66 eliminates the application of force to the brake pads 16 and 18 (FIGS. 1–3) so that the disc 12 is freely rotatable.

When the disc 12 is to be held against rotation, the electromagnet in the armature assembly 36 is de-energized and a strong coil spring moves the armatures 38 and 40 apart. This results in pivoting movement of the armatures 38 and 40 about the leaf spring connections 60 (FIG. 3) with the support plate 56. As the armatures 38 and 40 are moved apart, the caliper arm 30 is rotated in a counterclockwise direction (as viewed in FIG. 2) about the pivot post 64 against the biasing spring 68. The caliper arm 32 is rotated in a clockwise direction (as viewed in FIG. 2) about the pivot post 66 against the biasing spring 69. This results in the brake pads 16 and 18 being pressed firmly against opposite sides 22 and 24 of the disc 12 to hold the disc against rotation.

It is contemplated that the disc 12 may be moved along its axis 14 of rotation by an apparatus connected with the disc. Thus, the disc 12 is initially be aligned with the actuator assembly 36 in the manner illustrated in FIGS. 2 and 4. When the disc 12 is in the initial position aligned with the actuator assembly 36, an axis 70 disposed midway between opposite side surfaces 22 and 24 on the disc 12, extends through the center of the actuator assembly 36. When the disc 12 is moved along the axis 14 by the apparatus connected with the disc, the disc moves to a location offset to one side of the axis 70.

As the disc 12 moves to a location offset from the axis 70, the actuator assembly 36 moves to a position offset from the axis 70. The manner in which the disc 12 moves from the aligned or centered position of FIG. 4 to an offset position is illustrated schematically in FIG. 5. The manner in which the actuator assembly 36 moves from the initial or aligned position of FIG. 4 to an offset position is also illustrated schematically in FIG. 5.

Figure 4:
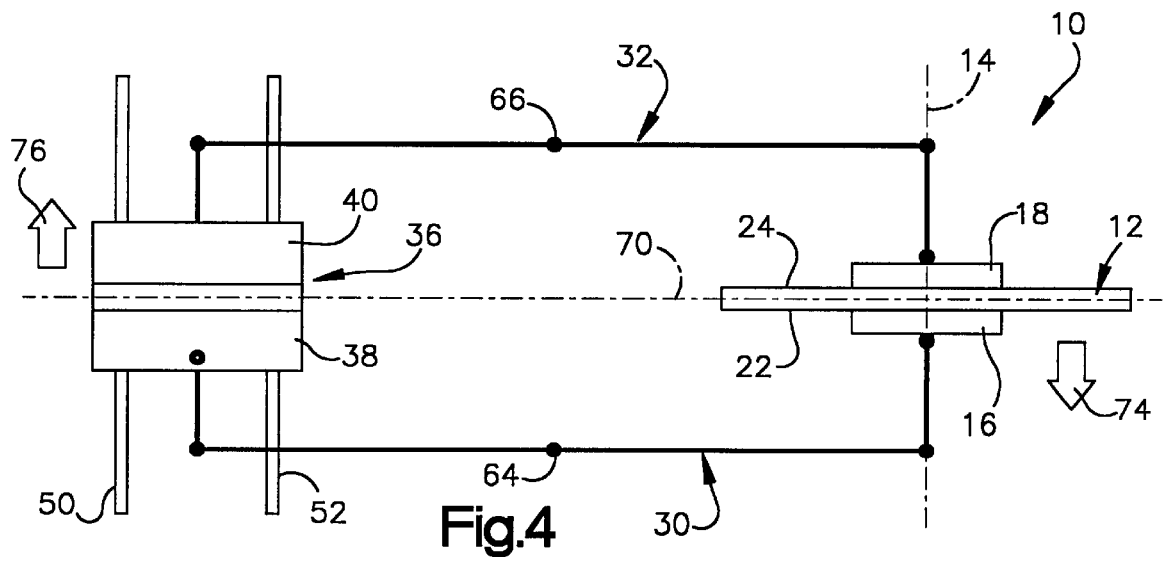
FIG. 4 is a schematic illustration of the brake assembly of FIG. 1 prior to movement of the disc along its axis of rotation.

When the disc 12 is in the initial or aligned position of FIG. 4, an apparatus (not shown) connected with the disc 12 applies force against the disc to move the disc in the direction of an arrow 74 in FIG. 4. The force applied to the disc 12 tending to move it in the direction of arrow 74 is transmitted through the caliper arm 30 to the actuator assembly 36. This force urges the actuator assembly 36 to move in the opposite direction, indicated by the arrow 76 in FIG. 4.

Figure 5:
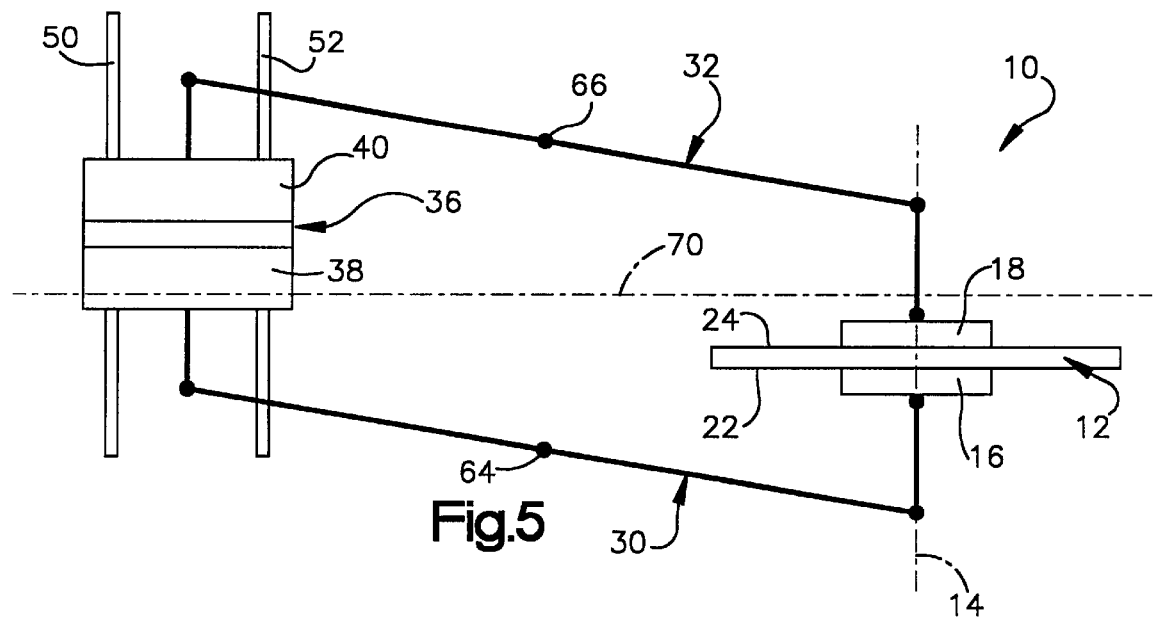
FIG. 5 is a schematic illustration, generally similar to FIG. 4, illustrating the brake assembly after movement of the disc along its axis of rotation.

During movement of the disc 12 from the initial position shown in FIG. 4 to the offset position shown in FIG. 5, the caliper arm 30 pivots about the pivot post 64. The caliper arm 30 transmits force to the actuator assembly 36 to move the actuator assembly 36 from the initial position shown in FIG. 4 to the offset position shown in FIG. 5. As the actuator assembly 36 moves to the offset position in FIG. 5, the support plate 56 (FIGS. 2 and 3) moves along the guide tracks or members 50 and 52 to a position offset from the initial position of the actuator assembly 36.

The disc 12 moves to a position which is offset in one direction from the initial position. The actuator assembly 36 moves to a position which is offset in the opposite direction from the initial position. This is due to the pivotal movement of the caliper arm 30 about the pivot post 64.

The caliper arm 30 is pivoted under the influence of force transmitted from the disc 12 through the brake pad 16 to the caliper arm 30. Simultaneously therewith, the caliper arm 32 is pivoted about the pivot post 66 under the influence of force transmitted from the actuator assembly 36 to the caliper arm. The pivotal movement of the caliper arm 32 transmits force to the brake 18 to move the brake pad with the disc 12.

If the disc 12 is moved in a direction opposite to the arrow 74 in FIG. 4, the actuator assembly 36 is moved in a direction opposite to the arrow 76 by the caliper arm 32. During movement of the disc 12 in a direction opposite to the arrow 74 in FIG. 4, the caliper arm 32 is pivoted in a counterclockwise direction (as viewed in FIGS. 2 and 4) about the pivot post 66. The caliper arm 32 transmits force to the actuator assembly 36 to move the actuator assembly in a direction opposite to the arrow 76 (FIG. 4).

The caliper arm 30 slopes downward (as viewed in FIG. 3) from the actuator assembly 36 to the pivot post 64. The caliper arm 30 then extends horizontally from the pivot post 64 to the brake pad 16. Thus, the caliper arm 30 has an end portion 80 which slopes upwardly and toward the left (as viewed in FIG. 3) from the pivot post 64 to a connection 82 with the armature 38 of the actuator assembly 36. The caliper arm 30 also includes an end portion 82 which extends horizontally from the pivot post 64 to the brake pad 16. Although only the structure of the caliper arm 30 is illustrated in FIG. 3, it should be understood that the caliper arm 32 has the same general configuration as the caliper arm 30.

The brake pad 16 is held in a reaction block 86 which is fixedly connected to the base plate 48. The reaction block 66 has a pair of upstanding end sections 88 and 90 which are disposed adjacent to opposite ends of the brake pad 16. The end sections 88 and 90 of the reaction block 86 partially define a rectangular opening 94 in which the rectangular brake pad 16 is disposed.

When the disc 12 is being rotated in a clockwise direction, as viewed in FIG. 3, the force transmitted from the side surface 22 of the disc 12 as the brake pad 16 is moved to an engaged condition presses the brake pad against the end section 88 of the reaction block 86. Similarly, when the disc 12 is being rotated in a counterclockwise direction, as viewed in FIG. 3, the force applied to the brake pad 16 by the side surface 22 of the disc 12 presses the brake pad 16 against the end section 90 of the reaction block 86. The force transmitted to either the end section 88 or 90 of the reaction block 86 during engagement of the brake pad 16 with the disc 12 is transmitted through the reaction block to the base plate 34 of the brake assembly 10.

Although only the brake pad 16 is illustrated in FIG. 3, it should be understood that the brake pad 18 is disposed axially opposite from and is aligned with brake pad 16. The brake pad 18 is identical to the brake pad 16. The brake pad 18 cooperates with a reaction block 98 (FIG. 2) having the same construction as the reaction block 86 and connected with the base plate 48.

The brake pads 16 and 18 and reaction blocks 86 and 98 are both disposed below (as viewed in FIG. 3) the axis 14 about which the disc 12 rotates. By having the brake pads 16 and 18 engage lower portions of opposite sides 22 and 24 of the disc 12, the brake assembly 10 has a compact construction and components of the brake assembly are accessible for maintenance purposes.

The caliper arm 30 has an arcuate end surface 102 (FIGS. 1 and 7) which engages an arcuate bottom surface 104 of a rectangular recess 106 in the brake pad 16. The arcuate bottom surface 104 (FIG. 6) of the recess 106 and the arcuate end surface 102 (FIG. 6) have the configurations of the outer side surfaces of cylinders of the same diameter.

The arcuate configuration of the end surface 102 on the caliper arm 30 and the arcuate configuration of the bottom surface 104 of the recess 106 in the brake pad 16 allow the orientation of the caliper arm to be changed relative to the brake pad during movement of the disc 12 along the axis 14 from the initial position of FIG. 4 to an offset position, such as the offset position illustrated schematically in FIG. 5. In addition, similar arcuate sliding connections are provided between the caliper arm 30 and the armature 38 to accommodate relative movement between the caliper arm and the actuator assembly 36. The connection between the caliper arm 30 and armature 38 have any desired construction which accommodates relative movement between the caliper arm and armature. For example, the connection between the caliper arm 30 and armature 38 could have the same construction as the trunions in the aforementioned U.S. Pat. No. 5,582,277.

Figure 6:
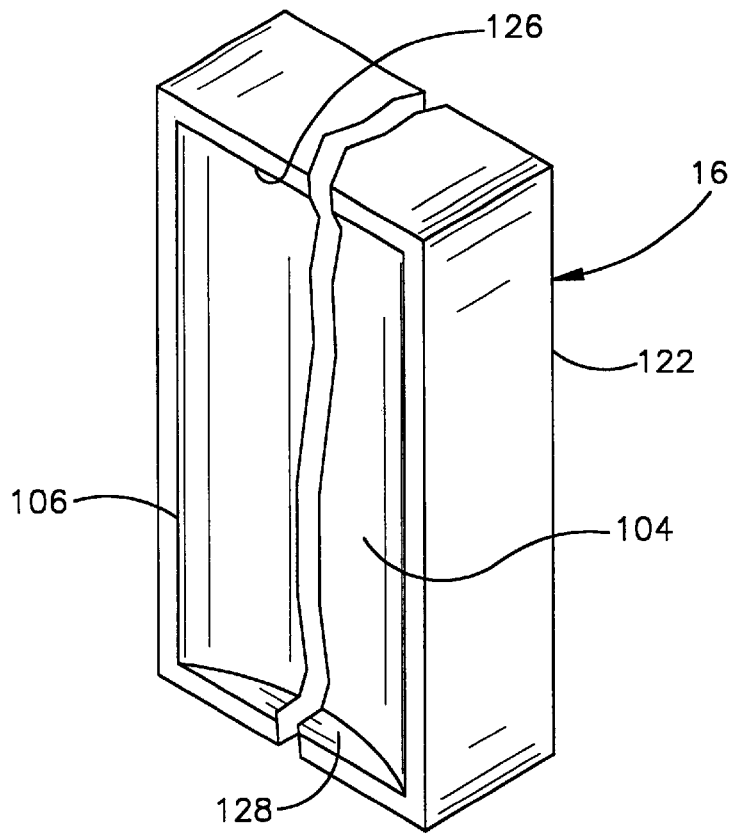
FIG. 6 is an enlarged fragmentary illustration of one of the brake pads in the brake assembly of FIG. 1.
Figure 7:
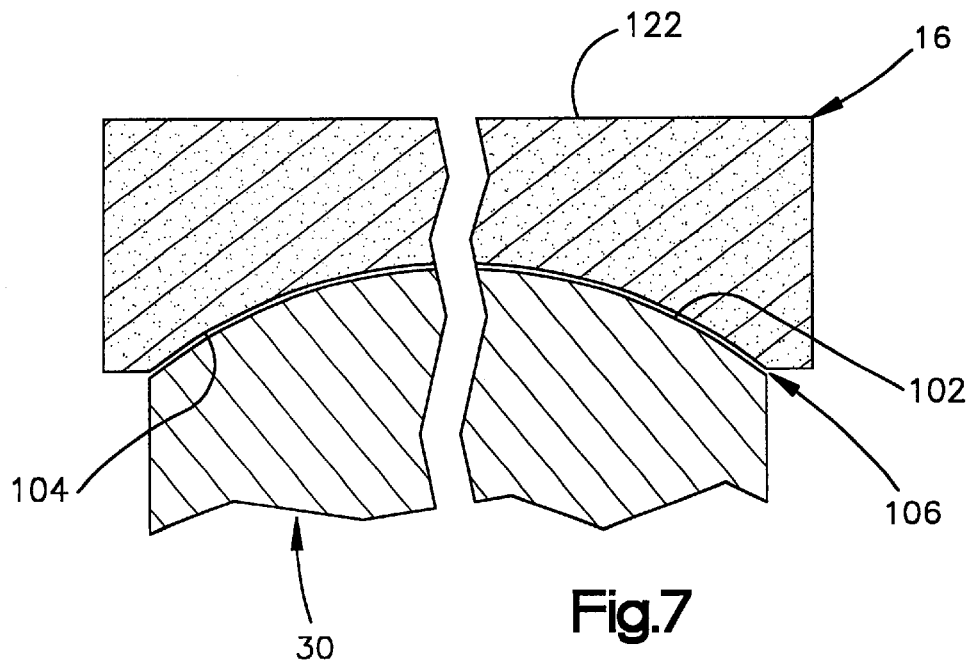
FIG. 7 is an enlarged fragmentary sectional view illustrating the relationship of the brake pad of FIG. 6 to an end portion of one of the caliper arms.

The caliper arm 32 has an arcuate end surface 112 (FIG. 2) which engages an arcuate bottom surface 114 of a rectangular recess 116 in the brake pad 18. The brake pad 18 has the same construction as the brake pad 16 (FIGS. 6 and 7). The caliper arm 32 has an end portion with the same construction as the end portion of the caliper arm 30 (FIG. 7).

The arcuate end surface 112 on the caliper arm 32 and the arcuate bottom surface 114 on the recess 116 of the brake pad 18 enables the orientation of the caliper arm 32 to be changed relative to the brake pad 18 during movement of the disc 12 along the axis 14 about which the disc rotates. A similar arcuate sliding joint is provided between the armature 40 and the caliper arm 32 to enable the orientation of the caliper arm to change relative to the armature 40 of the actuator assembly 36.

The brake pad 16 (FIG. 6) has a flat rectangular friction surface 122 (FIGS. 6 and 7). To promote a relatively uniform transmission of force from the caliper arm 30 (FIG. 7) to the brake pad 16, the arcuate end surface 102 on the caliper arm 30 has an area which is at least 75 percent of the area of the friction surface 122. The bottom surface 104 (FIG. 6) on the brake pad 16 is the same size as the surface 102 on the caliper arm 30.

The arcuate end surface 102 on the caliper arm 30 (FIG. 7) is convex and faces in a direction toward the friction surface 122 on the brake pad 16. Similarly, the bottom surface 104 on the brake pad 16 is concave and faces away from the friction surface 122. Since the end surface 102 on the caliper arm 30 and the bottom surface 104 on the brake pad 16 have the same radius of curvature, the end portion of the caliper arm is freely movable relative to the brake pad 16 when the disc 12 moves from the aligned position shown in FIG. 4 to the offset position shown in FIG. 5.

The rectangular recess 106 in the brake pad 16 has restraint lips 126 and 128 which limit relative movement between the end portion of the caliper arm 30 and the brake pad 16. When the brake pad 16 is installed in the brake assembly 10 (FIG. 1), the restraint lips 126 and 128 limit vertical (as viewed in FIGS. 1 and 3) movement of the brake pad relative to the caliper arm 30. The restraint lips 126 and 128 (FIG. 6) are formed as segments of circles having the same diameter as the arcuate bottom surface 104 of the recess 106.

Second Embodiment

Figure 8:
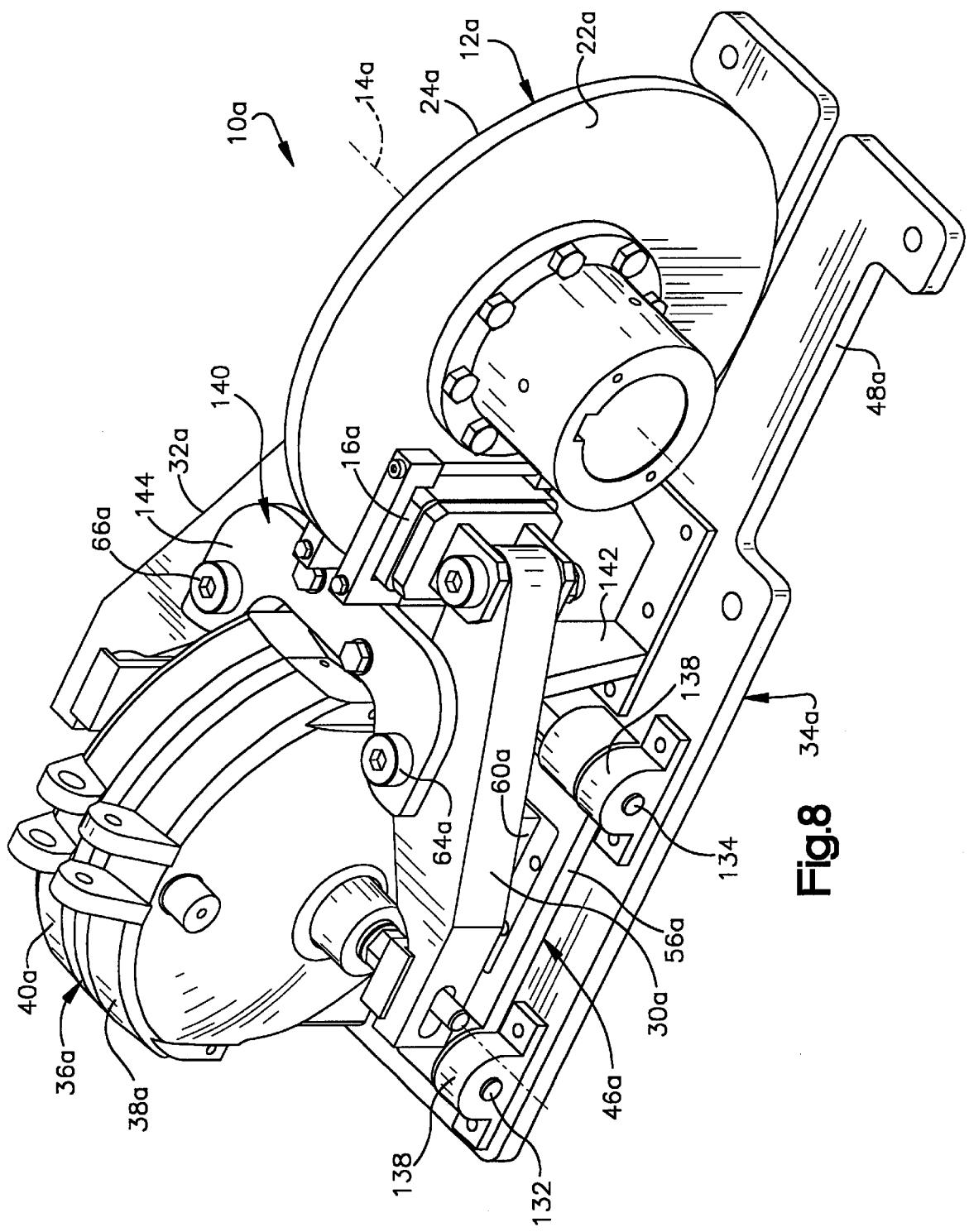
FIG. 8 is a pictorial illustration of a second embodiment of the brake assembly.

A second embodiment of the brake assembly is illustrated in FIG. 8. Since the embodiment of the brake assembly illustrated in FIG. 8 is generally similar to the embodiment of the brake assembly illustrated in FIGS. 1–7 and operates in the same manner, generally similar numerals will be utilized to designate similar components, the suffix letter "a" being associated being associated with the numerals of FIG. 8 to avoid confusion.

A brake assembly 10a (FIG. 6) includes a disc 12a which is rotatable about a central axis 14a. The disc 12a is connected with an apparatus (not shown) which is operable to move the disc 12a along the axis 14a about which the disc rotates.

A brake pad 16a is engageable with a side surface 22a of the disc 12a. Similarly, a brake pad (not shown) is engageable with an opposite side surface 24a of the disc 12a. The brake pads are pressed against opposite sides 22a and 24a of the disc 12a by a pair of caliper arms 30a and 32a.

An actuator assembly 36a is disposed between the caliper arms 30a and 32a. The actuator assembly 36a includes a pair of armatures 38a and 40a which are movable relative to each other to pivot the caliper arms 30a and 32a.

The brake assembly 10a has a base 34a. The base 34a includes a base plate 48a. The actuator assembly 36a is mounted on a support assembly 46a. The support assembly 48a includes a support plate 56a to which the armatures 38a and 40a are connected by spring plates 60a.

The support plate 56a is movable relative to the base 34a. The support plate 56a is connected to guide shafts or members 132 and 134 which are supported for axial movement relative to the base 34a by guide blocks 138. Although only two guide blocks 138 have been shown in FIG. 8 adjacent to end portions of the guide shafts or members 132 and 134, it should be understood that a second pair of guide blocks are disposed adjacent to the opposite ends of the guide shafts 132 and 134. The guide shafts or members 132 and 134 cooperate with the guide blocks 138 to enable the support plate 56a to move along a path which extends parallel to the axis 14a about which the disc 22a rotates.

The caliper arms 30a and 32a are connected with pivot posts 64a and 66a. The pivot posts 64a and 66a are disposed on a bracket assembly 140. The bracket assembly includes an upstanding main section 142 and an end section 144. The main section 142 is fixedly connected to the base 34a. The end section 144 is fixedly connected to the main section 142.

When the disc 12a is moved along its axis of rotation 14a, one of the caliper arms 30a or 32a transmits force to the actuator assembly 36a to move the support assembly relative to the guide blocks 138 and base 34a. Force is transmitted between the disc 12a and the actuator assembly 36a to move the actuator assembly in the same manner as previously explained in conjunction with FIGS. 4 and 5. However, rather than moving along the guide tracks 50 and 52 of FIGS. 4 and 5, the actuator assembly 36a of FIG. 8 moves along guide blocks 138 at opposite ends of the guide shafts 132 and 134. The guide shafts 132 and 134 move axially relative to the guide blocks 138.

Conclusion

The present invention provides a new and improved brake assembly 10 having a rotatable disc 12 which is movable along its axis of rotation. Improved brake pads 16 and 18 are pressed against opposite sides 22 and 24 of the disc 12 by caliper arms 30 and 32. An actuator assembly 36 is connected with the caliper arms 30 and 32 and is operable to cause the caliper arms to press the brake pads 16 and 18 against opposite sides of the disc.

The actuator assembly 36 is supported for movement along the axis 14 of rotation of the disc 12 to accommodate movement of the disc along its axis of rotation. The actuator assembly 36 is movable along the axis 14 of rotation of the disc 12 under the influence of force transmitted from the disc through the caliper arms 30 and 32 to the actuator assembly.

What is claimed is:

1. A brake assembly comprising a rotatable disc which is movable along its axis of rotation, first and second brake pads engagable with axially opposite sides of said disc, a first caliper arm connected with said first brake pad, a second caliper arm connected with said second brake pad, an actuator assembly connected with said first and second caliper arms, said actuator assembly being operable from a disengaged condition to an engaged condition to press said first and second brake pads against the axially opposite sides of said disc, and support means for supporting said actuator assembly for movement along an axis substantially parallel to the axis of rotation of said disc to accommodate movement of said disc along the axis of rotation of said disc, said actuator assembly is disposed between said first and second caliper arms and is operable to simultaneously pivot said first and second caliper arms to press said first and second brake pads against the axially opposite sides of said disc.

2. An apparatus as set forth in claim 1 wherein said actuator assembly is movable along the axis of rotation of said disc under the influence of force transmitted from said disc to said actuator assembly through said first and second caliper arms.

3. An apparatus as set forth in claim 1 wherein said support means includes a guide relative to which said actuator assembly is movable when said disc moves along the axis of rotation of said disc.

4. An apparatus as set forth in claim 1 further including a base on which said caliper arms are pivotally supported, said first and second brake pads being disposed between the axis of rotation of said disc and said base.

5. An apparatus as set forth in claim 4 wherein said first caliper arm has a first section which extends along said base away from a pivot connection between said base and said first caliper arm toward said first brake pad and an upwardly sloping section which extends upward away from said pivot connection between said base and said first caliper arm toward a connection between said first caliper arm and said actuator assembly, said second caliper arm having a first section which extends along said base away from a pivot connection between said base and said second caliper arm toward said second brake pad and an upwardly sloping section which extends upward away from said pivot connection between said base and said second caliper arm toward a connection between said second caliper arm and said actuator assembly.

6. A brake assembly as set forth in claim 1 wherein said first caliper arm has an arcuate end surface which is disposed in engagement with an arcuate surface on said first brake pad, said second caliper arm has an arcuate end surface which is disposed in engagement with an arcuate surface on said second brake pad.

7. A brake assembly as set forth in claim 6 wherein said arcuate end surface on said first caliper arm is convex and faces toward said disc, said arcuate end surface on said second caliper arm is convex and faces toward said disc.

8. A brake assembly as set forth in claim 7 wherein said arcuate end surface on said first caliper arm extends across an entire end portion of said first caliper arm and said arcuate end surface on said second caliper arm extends across an entire end portion of said second caliper arm.

9. A brake assembly as set forth in claim 6 wherein said first brake pad has a first friction surface which is pressed against a first side of said disc by said first caliper arm when said actuator assembly is in the engaged condition, said arcuate end surface on said first caliper arm having a surface area which is at least as great as 75 percent of the surface area of said first friction surface, said second brake pad has a second friction surface which is pressed against a second side of said disc by said second caliper arm when said actuator assembly is in the engaged condition, said arcuate end surface on said second caliper arm having a surface area which is at least as great as 75 percent of the surface area of said second friction surface.

10. A brake assembly as set forth in claim 1 wherein said first brake pad has a flat friction surface which is engagable with a first side surface on said disc, said first brake pad having an arcuate surface on a side of said first brake pad opposite from said friction surface, said arcuate surface on said first brake pad having a surface area which is at least as great as 75 percent of the surface area of said friction surface on said first brake pad, said second brake pad having a flat friction surface which is engagable with a second side surface on said disc, said second brake pad having an arcuate surface on a side of said second brake pad opposite from said friction surface on said second brake pad, said arcuate surface on said second brake pad having a surface area which is at least as great as 75 percent of the surface area of said friction surface on said second brake pad.

11. An apparatus as set forth in claim 10 wherein said arcuate surface on said first brake pad is concave in a direction toward said friction surface on said first brake pad and has a center of curvature which is offset from said first brake pad in a direction away from said friction surface on said first brake pad, said arcuate surface on said second brake pad is concave in a direction toward said friction surface on said second brake pad and has a center of curvature which is offset from said second brake pad in a direction away from said friction surface on said second brake pad.

12. An apparatus as set forth in claim 10 wherein said arcuate surface on said first brake pad has a configuration corresponding to the configuration of a portion of a surface of a cylinder and said arcuate surface on said second brake pad has a configuration corresponding to the configuration of a portion of a surface of a cylinder.

13. A brake assembly comprising a rotatable disc which is movable along its axis of rotation, first and second brake pads engagable with axially opposite sides of said disc, a first caliper arm connected with said first brake pad, a second caliper arm connected with said second brake pad, an actuator assembly connected with said first and second caliper arms, said actuator assembly being operable from a disengaged condition to an engaged condition to press said first and second brake pads against the axially opposite sides of said disc, support means for supporting said actuator assembly for movement along an axis substantially parallel to the axis of rotation of said disc to accommodate movement of said disc along the axis of rotation of said disc, and a base on which said caliper arms are pivotally supported, said first and second brake pads being disposed between the axis of rotation of said disc and said base.

14. An apparatus as set forth in claim 13 wherein said actuator assembly is movable along the axis of rotation of said disc under the influence of force transmitted from said disc to said actuator assembly through said first and second caliper arms.

15. An apparatus as set forth in claim 13 wherein said support means includes a guide relative to which said actuator assembly is movable when said disc moves along the axis of rotation of said disc.

16. An apparatus as set forth in claim 13 wherein said actuator assembly is disposed between said first and second caliper arms and is operable to simultaneously pivot said first and second caliper arms to press said first and second brake pads against the axially opposite sides of said disc, at least one of said first and second caliper arms being effective to transmit force to move said arms being effective to transmit force to move said actuator assembly along the axis of rotation of said disc during movement of said disc along the axis of rotation of said disc.

17. An apparatus as set forth in claim 13 wherein said first caliper arm has a first section which extends along said base away from a pivot connection between said base and said first caliper arm toward said first brake pad and an upwardly sloping section which extends upward away from said pivot connection between said base and said first caliper arm toward a connection between said first caliper arm and said actuator assembly, said second caliper arm having a first section which extends along said base away from a pivot connection between said base and said second caliper arm toward said second brake pad and an upwardly sloping section which extends upward away from said pivot connection between said base and said second caliper arm toward a connection between said second caliper arm and said actuator assembly.

18. A brake assembly as set forth in claim 13 wherein said first caliper arm has an arcuate end surface which is disposed in engagement with an arcuate surface on said first brake pad, said second caliper arm has an arcuate end surface which is disposed in engagement with an arcuate surface on said second brake pad.

19. A brake assembly as set forth in claim 18 wherein said arcuate end surface on said first caliper arm is convex and faces toward said disc, said arcuate end surface on said second caliper arm is convex and faces toward said disc.

20. A brake assembly as set forth in claim 19 wherein said arcuate end surface on said first caliper arm extends across an entire end portion of said first caliper arm and said arcuate end surface on said second caliper arm extends across an entire end portion of said second caliper arm.

21. A brake assembly as set forth in claim 13 wherein said first brake pad has a first friction surface which is pressed against a first side of said disc by said first caliper arm when said actuator assembly is in the engaged condition, said arcuate end surface on said first caliper arm having a surface area which is at least as great as 75 percent of the surface area of said first friction surface, said second brake pad has a second friction surface which is pressed against a second side of said disc by said second caliper arm when said actuator assembly is in the engaged condition, said arcuate end surface on said second caliper arm having a surface area which is at least as great as 75 percent of the surface area of said second friction surface.

22. A brake assembly as set forth in claim 13 wherein said first brake pad has a flat friction surface which is engagable with a side surface on said disc, said first brake pad having an arcuate surface on a side of said first brake pad opposite from said friction surface, said arcuate surface on said first brake pad having a surface area which is at least as great as 75 percent of the surface area of said friction surface on said first brake pad, said second brake pad having a flat friction surface which is engagable with a second side surface on said disc, said second brake pad having an arcuate surface on a side of said second brake pad opposite from said friction surface on said second brake pad, said arcuate surface on said second brake pad having a surface area which is at least as great as 75 percent of the surface area of said friction surface on said second brake pad.

23. An apparatus as set forth in claim 22 wherein said arcuate surface on said first brake pad is concave in a direction toward said friction surface on said first brake pad and has a center of curvature which is offset from said first brake pad in a direction away from said friction surface on said first brake pad, said arcuate surface on said second brake pad is concave in a direction toward said friction surface on said second brake pad and has a center of curvature which is offset from said second brake pad in a direction away from said friction surface on said second brake pad.

24. An apparatus as set forth in claim 22 wherein said arcuate surface on said first brake pad has a configuration corresponding to the configuration of a portion of a surface of a cylinder and said arcuate surface on said second brake pad has a configuration corresponding to the configuration of a portion of a surface of a cylinder.

25. A brake assembly comprising a rotatable disc which is movable along its axis of rotation, first and second brake pads engagable with axially opposite sides of said disc, a first caliper arm connected with said first brake pad, said first caliper arm has an arcuate end surface which is disposed in engagement with an arcuate surface on said first brake pad, a second caliper arm connected with said second brake pad, said second caliper arm having an arcuate end surface which is disposed in engagement with an arcuate surface on said second brake pad, an actuator assembly connected with said first and second caliper arms, said actuator assembly being operable from a disengaged condition to an engaged condition to press said first and second brake pads against the axially opposite sides of said disc, and support means for supporting said actuator assembly for movement along an axis substantially parallel to the axis of rotation of said disc to accommodate movement of said disc along the axis of rotation of said disc.

26. An apparatus as set forth in claim 25 wherein said actuator assembly is movable along the axis of rotation of said disc under the influence of force transmitted from said disc to said actuator assembly through said first and second caliper arms.

27. An apparatus as set forth in claim 25 wherein said support means includes a guide relative to which said actuator assembly is movable when said disc moves along the axis of rotation of said disc.

28. An apparatus as set forth in claim 25 wherein said actuator assembly is disposed between said first and second caliper arms and is operable to simultaneously pivot said first and second caliper arms to press said first and second brake pads against the axially opposite sides of said disc, at least one of said first and second caliper arms being effective to transmit force to move said actuator assembly along the axis of rotation of said disc during movement of said disc along the axis of rotation of said disc.

29. An apparatus as set forth in claim 25 wherein said first caliper arm has a first section which extends toward said first brake pad and a second section which extends upward from said first section toward a connection between said first caliper arm and said actuator assembly, said second caliper arm having a first section which extends toward said second brake pad and a second section which extends upward from said first section of said second caliper arm toward a connection between said second caliper arm and said actuator assembly.

30. A brake assembly as set forth in claim 29 wherein said arcuate end surface on said first caliper arm is convex and faces toward said disc, said arcuate end surface on said second caliper arm is convex and faces toward said disc.

31. A brake assembly as set forth in claim 30 wherein said arcuate end surface on said first caliper arm extends across an entire end portion of said first caliper arm and said arcuate end surface on said second caliper arm extends across an entire end portion of said second caliper arm.

32. A brake assembly as set forth in claim 29 wherein said first brake pad has a first friction surface which is pressed against a first side of said disc by said first caliper arm when said actuator assembly is in the engaged condition, said arcuate end surface on said first caliper arm having a surface area which is at least as great as 75 percent of the surface area of said first friction surface, said second brake pad has a second friction surface which is pressed against a second side of said disc by said second caliper arm when said actuator assembly is in the engaged condition, said arcuate end surface on said second caliper arm having a surface area which is at least as great as 75 percent of the surface area of said second friction surface.

33. A brake assembly comprising a rotatable disc which is movable along its axis of rotation, first and second brake pads engagable with axially opposite sides of said disc, an actuator assembly which is spaced from said disc in a direction transverse to the axis of rotation of said disc, said actuator assembly being spaced from the axis of rotation of said disc by a distance which is greater than a radial extent of said disc, a first caliper arm having a first end portion connected with said first brake pad and a second end portion connected with said actuator assembly, a second caliper arm having a first end portion connected with said second brake pad and a second end portion connected with said actuator assembly, said actuator assembly being operable from a disengaged condition to an engaged condition to move said second end portions of said first and second caliper arms and press said first and second brake pads against axially opposite sides of said disc, and support means for supporting said actuator assembly for movement along the axis of rotation of said disc to accommodate movement of said disc along the axis of rotation of said disc.

34. An apparatus as set forth in claim 33 wherein said actuator assembly is movable along the axis of rotation of said disc under the influence of force transmitted from said disc to said actuator assembly through said first and second caliper arms.

35. An apparatus as set forth in claim 33 wherein said support means includes a guide relative to which said actuator assembly is movable when said disc moves along the axis of rotation of said disc.

36. An apparatus as set forth in claim 33 wherein said actuator assembly is disposed between said second end portions said first and second caliper arms and is operable to simultaneously pivot said first and second caliper arms in opposite directions to press said first and second brake pads against the axially opposite sides of said disc.

37. An apparatus as set forth in claim 33 further including a base on which said first and second caliper arms are pivotally supported, said first and second brake pads being disposed between the axis of rotation of said disc and said base.

38. An apparatus as set forth in claim 33 wherein said first caliper arm has an intermediate portion which extends between said first and second end portions of said first caliper arm, said first caliper arm being pivotal about an axis which extends through said intermediate portion of said first caliper arm by said actuator assembly, said second caliper arm having an intermediate portion which extends between said first and second end portions of said second caliper arm, said second caliper arm being pivotal about an axis which extends through said intermediate portion of said second caliper arm by said actuator assembly.

39. A brake assembly as set forth in claim 33 wherein said first end portion of said first caliper arm has an arcuate end surface which is disposed in engagement with an arcuate surface on said first brake pad, said first end portion of said second caliper arm has an arcuate end surface which is disposed in engagement with an arcuate surface on said second brake pad.

40. A brake assembly as set forth in claim 39 wherein said arcuate end surface on said first end portion of said first caliper arm is convex and faces toward said disc, said arcuate end surface on said first end portion of said second caliper arm is convex and faces toward said disc.

41. A brake assembly as set forth in claim 40 wherein said arcuate end surface on said first caliper arm extends across said first end portion of said first caliper arm and said arcuate end surface on said second caliper arm extends across said first end portion of said second caliper arm.

42. A brake assembly as set forth in claim 39 wherein said first brake pad has a first friction surface which is pressed against a first side of said disc by said first caliper arm when said actuator assembly is in the engaged condition, said arcuate end surface on said first caliper arm having a surface area which is at least as great as 75 percent of the surface area of said first friction surface, said second brake pad has a second friction surface which is pressed against a second side of said disc by said second caliper arm when said actuator assembly is in the engaged condition, said arcuate end surface on said second caliper arm having a surface area which is at least as great as 75 percent of the surface area of said second friction surface.

43. A method comprising the steps of rotating a brake disc about an axis extending through a center of the brake disc, moving the brake disc along the axis about which the brake disc rotates, transmitting force from a brake actuator assembly through first and second caliper arms to press brake pads against opposite sides of the brake disc to retard rotation of the brake disc, said step of transmitting force from the brake actuator assembly through first and second caliper arms includes pivoting the first caliper arm in a first direction about a first axis and pivoting the second caliper arm in a second direction about a second axis, and moving the brake actuator assembly along an axis substantially parallel to the axis of rotation of the brake disc under the influence of force transmitted from the brake disc to the brake actuator assembly through at least one of the caliper arms during movement of the brake disc along the axis of rotation of the brake disc.

44. A method as set forth in claim 43 wherein said step of moving the brake disc along the axis about which the brake disc rotates includes moving the brake disc in a first direction along the axis about which the brake disc rotates, said step of moving the brake actuator assembly along the axis of rotation of the brake disc includes moving the brake actuator assembly in a second direction along the axis about which the brake disc rotates, said second direction being opposite to said first direction.

* * * * *